April 2, 1963 W. W. BELL, JR 3,083,796
STRUCTURAL SPACER MEMBER
Filed Jan. 2, 1959

INVENTOR
WILLIAM W. BELL, JR.

BY *Herman Seid*

ATTORNEY

United States Patent Office 3,083,796
Patented Apr. 2, 1963

3,083,796
STRUCTURAL SPACER MEMBER
William W. Bell, Jr., East Hill, N.Y., assignor to Carrier Corporation, Syracuse, N.Y., a corporation of Delaware
Filed Jan. 2, 1959, Ser. No. 784,602
2 Claims. (Cl. 189—36)

This invention relates broadly to structural members. More particularly, this invention relates to a novel spacer element employed for the purpose of maintaining two structural members in spaced relation to one another.

Very often circumstances arise where it is desired that two structural members such as panels or brackets or a combination of a wall or panel and a bracket must be maintained in spaced relation. Normally, this is accomplished by using a spacer element, arranged to engage the confronting surfaces of the structural members, which includes a passage in alignment with openings in the structural members for the purpose of accommodating a fastening element.

The primary objective of this invention is the provision of an improved spacer element arranged so that assembly of the structural members with the spacer element as well as the fastening element may be completed in an efficient manner by making provision for assemblying the spacer member about the fastening element in such a manner that separation of the fastening element with one of the two structural members, prior to effecting complete assembly, is prevented.

Another object is the provision of a novel spacer element arranged so that assembly of the element with a pair of structural members may be effected without the need for special tools.

Another object of the invention is the provision of a novel method of connecting two structural members and a spacer element which maintains the structural members in spaced relation to each other.

This invention involves a spacer element having resilient tabs for slidably mounting the spacer over the threaded shank portion of a fastening element to prevent separation of the fastening element and one of two structural members prior to assembling the second structural member to the subassembly described.

Other objects and features of the invention will be apparent upon consideration of the ensuing specification and drawings wherein.

Figure 1:
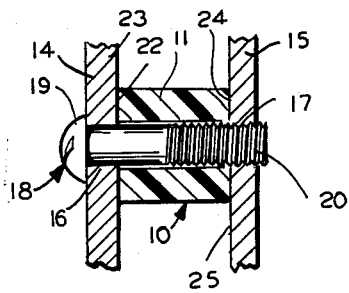
FIGURE 1 is a view in cross section of a portion of two structural members connected with a threaded fastener and fixed in a spaced relationship by the spacer element forming the subject of this invention.
Figure 3:
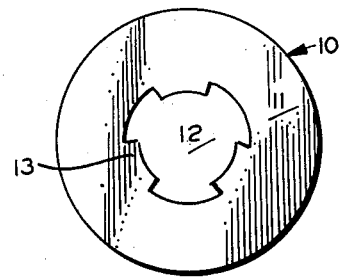
FIGURE 3 is an end view of the spacer element.

Referring to the drawings, for a more complete description of the invention, it will be appreciated that there are a number of applications wherein it is necessary to unite two structural members in spaced relation to one another. A specific example of the type of connection to which this invention relates is an arrangement for connecting a liner or interior compartment to a shell or outer cabinet in a refrigerator. In such a construction, it is desirable that the liner supporting member be connected in spaced relation to a bracket on the wall of the cabinet or shell of the refrigerator by an assembly including an insulating spacing element. With such an arrangement the relatively cold wall of the refrigerator liner, which is in heat transfer relation with the evaporator of the refrigeration system serving the refrigerator, must be thermally isolated to as great an extent as possible from the refrigerator cabinet to prevent moisture condensation on the exterior of the cabinet. Thus, a transfer of heat from the cabinet of the refrigerator to the liner by conduction, is maintained at a minimum and the possibility of "sweating" or moisture condensation on the cabinet likewise maintained at a minimum.

Figure 2:
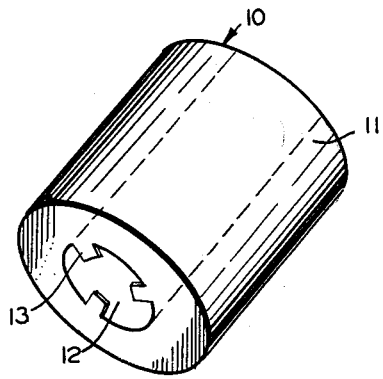
FIGURE 2 is a perspective view of the spacer element shown in FIGURE 1.
Figure 4:
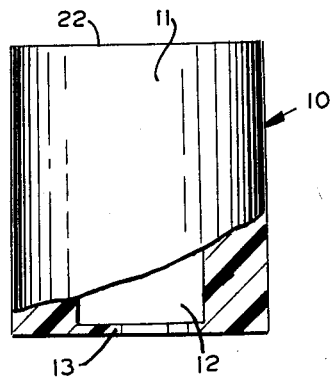
FIGURE 4 is a side view partially in section of the spacer element.

The spacer 10 forming the subject of this invention is provided with a body portion 11 having a passage 12 extending therethrough. A plurality of tabs or fingers 13 extend radially from the side of the body portion defining the passage 12 in the manner shown in FIGURES 2 and 4. The extent to which the fingers 13 project is determined by the thread size on the fastening element to be later described.

The other elements involved in the connection under consideration include a bracket 14 (which may be connected to a liner, not shown) a portion of which is illustrated in FIGURE 1, and a bracket 15 which may be connected to a wall of a refrigerator. Bracket 14 is provided with an aperture 16 and bracket 15 is provided with a threaded opening 17. The structural members 14 and 15 are adapted to be maintained in spaced relation with each other through the agency of a fastening element 18 and the spacer element 10. The fastening element shown as a bolt includes head portion 19 and threaded shank portion 20.

Figure 5:
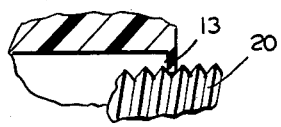
FIGURE 5 is a fragmentary view illustrating the relationship between the fastening element and a portion of the spacer element.

The spacer element is connected into the assembly shown in FIGURE 1 in the following manner: First the threaded fastening element 18 is inserted through aperture 16 in bracket 14. The spacer element is then thrust or pushed over the threaded shank of the portion of the fastening element projecting through aperture 16 by inserting the end of the spacer element remote from the end at which the fingers 13 are located over the shank. The fingers 13 are so constructed as to flex when they engage the crests of the threads on the portion 20 of the fastening element over which they must slide when the spacer is applied. They are however, proportioned so as to engage the sides of adjacent threads and to maintain their position therein in the absence of a force sufficient to cause the spacer to be removed in the manner similar to that with which it was applied, note FIGURE 5.

It will thus be obvious that separation of the fastening element 18 from the structural member 14 is impossible unless a substantial force is involved. The final assembly is achieved by applying the threaded fastening element to the member 15 through the threaded opening 17. In the final assembled form the spacer is so arranged that surface 22 engages a face 23 of the bracket 14 while the surface 24 of the spacer member is in engagement with surface 25 of bracket 15 which confronts the surface 23 of the bracket 14.

It will thus be obvious that there is provided a construction for maintaining two structural members in spaced relation to one another which is capable of expediting assembly of the completed connection with a minimum amount of labor and in the absence of any special tools for the purpose.

While I have described a preferred embodiment of the invention, it will be understood the invention is not limited thereto since it may be otherwise embodied within the scope of the following claims.

I claim:

1. In combination, a first structural member having an unthreaded opening for passage of an externally threaded fastener; a second structural member having a threaded opening for connection with said externally threaded fastener; an externally threaded fastener; and a spacer member for assuring a predetermined spaced relationship between said structural members when the fastener extends through the unthreaded opening in the first structural member and is threadably united with the second structural member, said spacer member including a body portion having a fastener accommodating passage extending therethrough and at least one resilient thread engaging finger projecting inwardly of said passage, said finger being constructed to flex over the crests of the threads on said fastener as the spacer member is assembled over the fastener as it projects through the unthreaded opening and to releasably engage in a root of any given thread preparatory to threadably connecting the fastener with the threaded opening in the second structural member.

2. A spacer for maintaining two structural members threadably connected by an externally threaded fastening member in a predetermined spaced relation, comprising a body portion having a fastener accommodating passage extending therethrough and at least one resilient thread engaging element projecting inwardly of said passage to obstruct passage of a fastener therethrough, said element being formed so as to flex as it engages the crests on said threaded fastening member and to releasably engage in any given thread root when slidably assembled over the threaded fastening member, the resistance to flexure of said element being substantially the same without regard to the direction of movement of said spacer over said fastener.

References Cited in the file of this patent
UNITED STATES PATENTS

| | | |
|---|---|---|
| 844,944 | Jacobs | Feb. 19, 1907 |
| 913,024 | Meacham | Feb. 23, 1909 |
| 2,639,832 | Bergstrom | May 26, 1953 |
| 2,936,501 | Koch | May 17, 1960 |

FOREIGN PATENTS

| | | |
|---|---|---|
| 745,788 | Great Britain | Feb. 29, 1956 |